July 7, 1942.  E. T. JOHNSON ET AL  2,288,950
MOWER
Filed Sept. 25, 1940  4 Sheets-Sheet 1
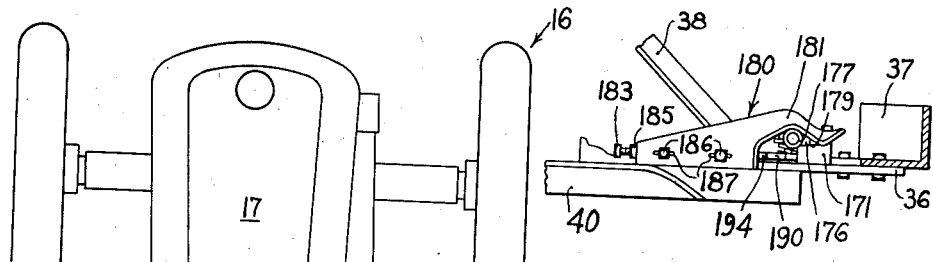
FIG. 9
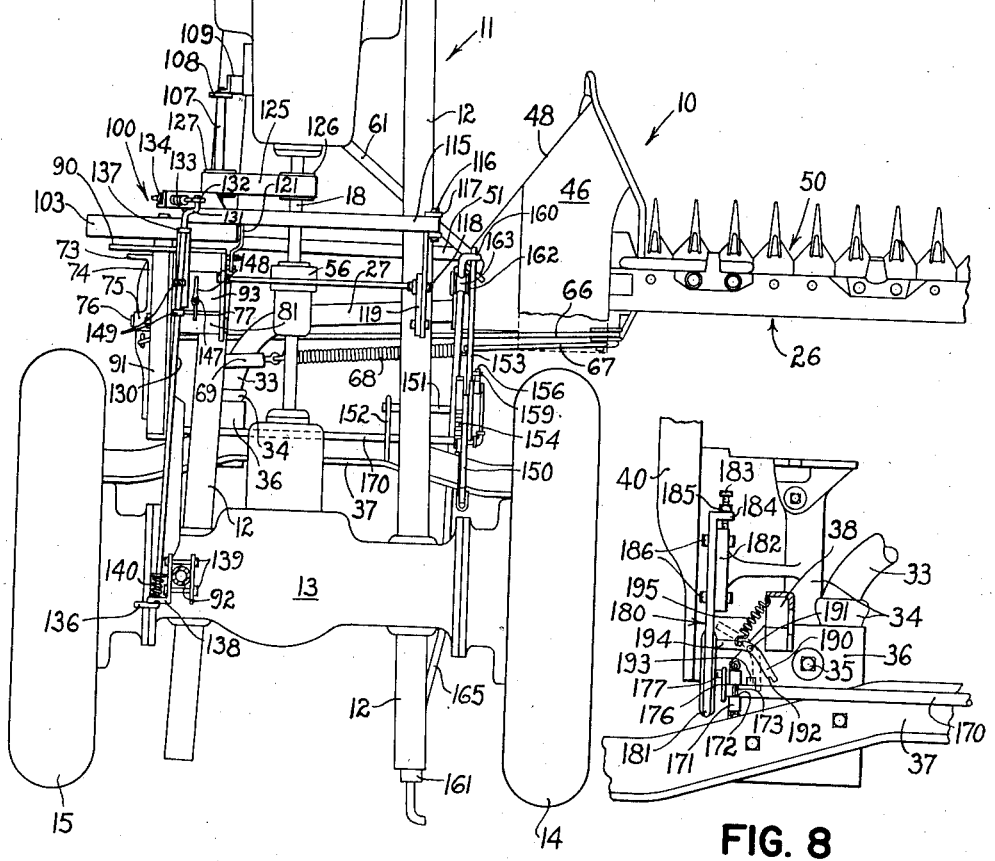
FIG. 1  FIG. 8
INVENTORS:
Ellsworth T. Johnson
Carl J. Frederiksen
BY
ATTORNEYS.

July 7, 1942.　　　E. T. JOHNSON ET AL　　　2,288,950
MOWER
Filed Sept. 25, 1940　　　　4 Sheets-Sheet 2

INVENTORS:
Ellsworth T. Johnson
Axel J. Frederiksen
BY
ATTORNEYS.

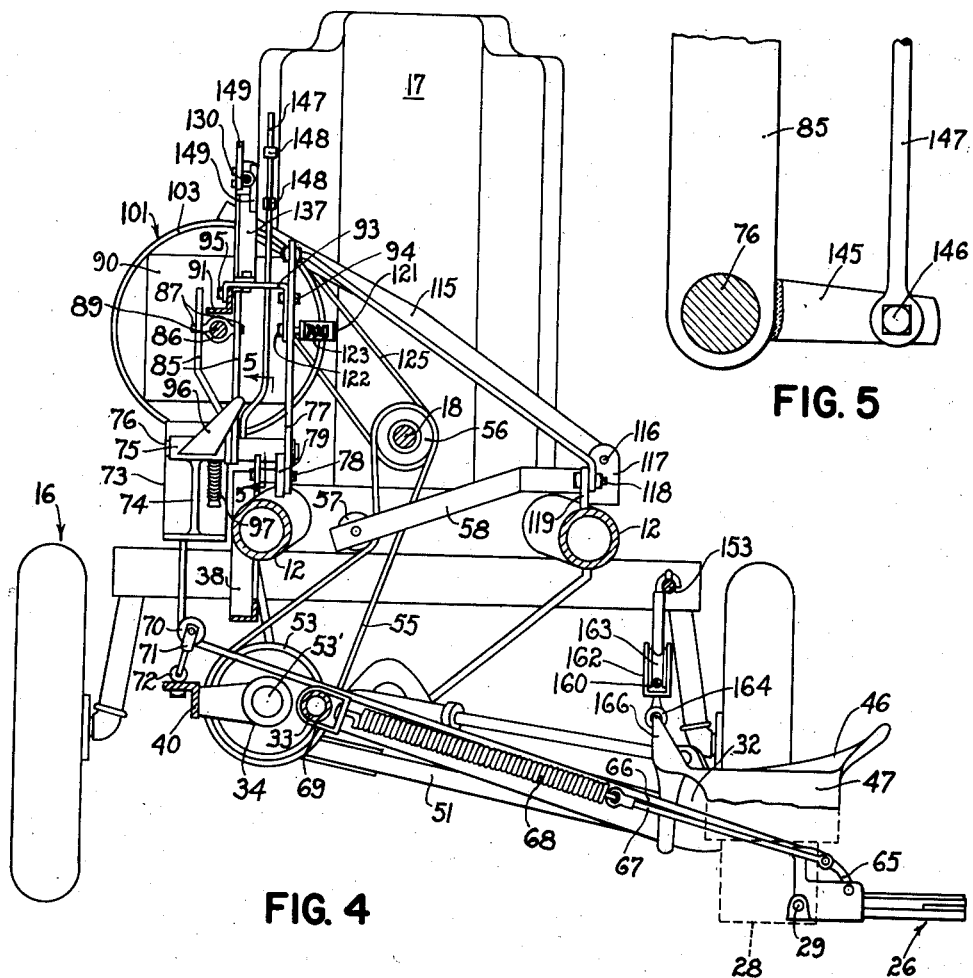

July 7, 1942.   E. T. JOHNSON ET AL   2,288,950
MOWER
Filed Sept. 25, 1940   4 Sheets-Sheet 4

INVENTORS:
*Ellsworth T. Johnson & Carl J. Frederiksen*
BY
ATTORNEYS.

Patented July 7, 1942

2,288,950

UNITED STATES PATENT OFFICE 2,288,950

MOWER

Ellsworth T. Johnson and Carl J. Frederiksen, Moline, Ill., assignors to Deere & Company, Moline, Ill., a corporation of Illinois Application September 25, 1940, Serial No. 358,260

17 Claims. (Cl. 56—25)

The present invention relates generally to mowers and more particularly to power driven mowers mounted on a self-propelled mobile frame, and has for its principal object the provision of a novel and improved lifting mechanism for a mower of this type. More specifically, it is a further object of this invention to provide an engine driven mower having improved mechanism for raising the cutter bar to transport position, which mechanism is operated by power derived from the engine which propels the mower frame. In the accomplishment of this object we have provided a threaded shaft driven from the engine and connected with the mower cutter bar for raising and lowering the latter by driving the threaded shaft selectively in opposite directions of rotation. Another related object has to do with the provision of novel and improved reversible control mechanism for selectively driving the threaded shaft in opposite directions of rotation.

In mowers of this type it is desirable to provide for swinging the entire cutter bar structure rearwardly when the latter encounters an obstruction in the field during operation, in order to prevent damage to the cutter bar structure and its supporting connections with the mobile frame. It is also desirable and customary to provide mechanism for holding the cutter bar at any desired height above the ground over which it is operating. This is particularly desirable when the mower is used for cutting vegetation along a highway along which is disposed a curbing whereby the mobile supporting frame of the mower travels at a lower elevation than the ground along which the cutter bar is operating. Thus, when the mower passes across an intersecting highway or street, the cutter bar does not drop to the pavement of the intersecting highway but is retained in elevated position so that it is not necessary to raise the cutter bar once more when the latter passes over the curb on the opposite side of the intersecting highway. Still another object has to do with the provision of latch mechanism between the supporting lever and the cutter bar supporting arm, the latch mechanism being disengageable when the cutter bar structure swings rearwardly to clear an obstruction, but after the structure has been restored to operating position the latch mechanism can be reconnected by merely lowering the control lever to pick up the supporting arm. In this respect the present invention is in the nature of an improvement over the supporting mechanism described and claimed in a co-pending application Serial No. 306,690, filed November 29, 1939, by Carl J. Frederiksen.

These and other objects and advantages will be apparent after a consideration of the following description in which reference is had to the appended drawings, in which Figure 1 is a plan view of a tractor mounted mower embodying the principles of the present invention;

Figure 4 is a sectional elevation also drawn to an enlarged scale and taken along a line 4—4 in Figure 2;

Figure 5 is a detail, drawn to an even larger scale, and taken in section along a line 5—5 in Figure 4;

Figure 8 is a fragmentary plan view showing the pivot connection between the cutter bar structure and the supporting frame, and the camming mechanism for disengaging the supporting lever from the cutter bar structure when the latter swings rearwardly; and Figure 9 is a side elevation of the camming mechanism.

Figure 2:
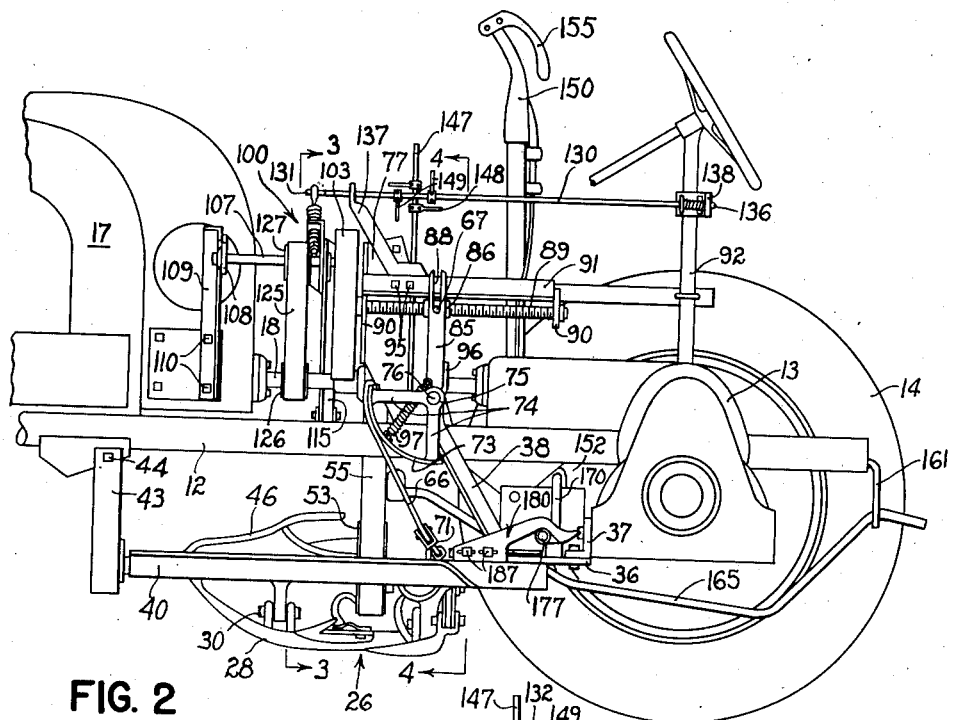
Figure 2 is a side elevation taken from the left side of the tractor.
Figure 3:
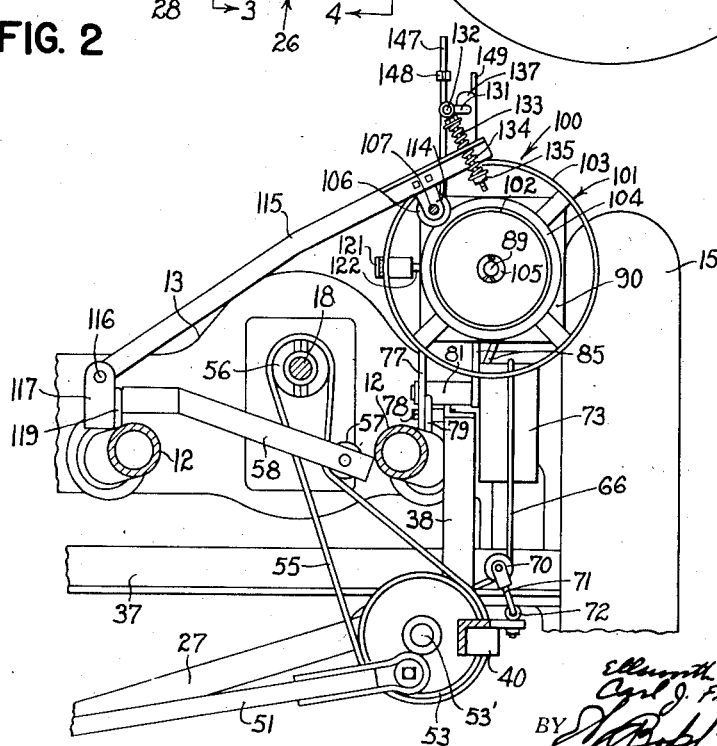
Figure 3 is a sectional elevation drawn to an enlarged scale and taken along a line 3—3 in Figure 2.

Referring now to the drawings, the mower disclosed in this embodiment of our invention is of the type disclosed by W. J. Coultas in an application, Serial No. 257,804, filed February 23, 1939. The mower, indicated generally by reference numeral 10, is mounted on a tractor 11 comprising a frame which includes a pair of longitudinally extending laterally spaced tubular frame members 12. The rear ends of the frame members are fixed to a transversely extending rear axle housing 13, at opposite ends of which are mounted a pair of rear traction wheels 14, 15, respectively. The forward ends of the frame members 12 are supported on a front dirigible truck 16 and on the front end of the frame is carried an engine housing 17 out of which extends rearwardly a propeller shaft 18 for driving the tractor wheels 14, 15.

The mower 10 comprises a cutter bar structure 25, which includes generally a cutter bar 26 of more or less conventional design, supported on a supporting arm 27. The inner end of the cutter bar 26 is carried on a conventional shoe 28, pivotally connected by a pair of aligned pivot bolts 29, 30 to a shoe arch 31, see Figure 6. The pivot bolts 29, 30 are longitudinally aligned to provide for vertical swinging movement of the cutter bar 26 in a transversely extending vertical plane. The shoe arch 31 is carried on a sleeve 32, which is journaled on the outer end of the supporting arm 27, providing for a limited amount of tilting movement of the shoe 28 with respect to the arm 27, as is well-known to those skilled in the art. The opposite end of the arm 27 is provided with a rearwardly extending portion 33, which is journaled in a supporting casting 34, thus providing for vertical swinging movement of the supporting arm 27 about a fore and aft extending axis. The supporting casting 34 is pivotally connected by means of a pivot bolt 35 to a plate 36 carried on a transverse frame member 37, which is supported on the rear axle housing 13, and tied to the frame member 12 by a brace 38. Thus, the mower cutter bar structure is freely swingable horizontally about the vertical axis of the pivot bolt 35. The structure is normally held in a transversely extending operating position, however, by means of a latch arm 40 fixed at its rear end to the supporting casting 34 and extending forwardly therefrom. The forward end 41 of the latch arm 40 is held by means of a suitable spring latch mechanism 42 carried on a support 43 which is fixed to the tractor frame by means of bolts 44. The details of the latch mechanism 42 have nothing to do with the present invention and are therefore not disclosed herein for the sake of simplicity. Thus, for this purpose it is sufficient to say that the latch 42 is yieldable when the cutter bar 26 encounters an obstruction in the field, thereby permitting the cutter bar structure to swing rearwardly about the pivot bolt 35 to clear the obstruction.

Inasmuch as the cutter bar structure is pivoted at one side of the tractor and extends across under the frame of the tractor and laterally therefrom at the opposite side of the tractor in front of the rear wheel of the latter, it is obvious that as the cutter bar swings rearwardly upon encountering an obstruction, it swings into contact with the tractor wheel. In order to provide for swinging the cutter bar around to its trailing position behind the tractor, a ramp or shield 46 is provided over the shoe arch 31 to permit the tractor wheel to roll over the cutter bar structure as the latter swings rearwardly. The ramp 46 is curved downwardly at 47 at the rear end thereof, and is also curved downwardly at 48 at the front end thereof to facilitate the passing of the wheel over the ramp and to lift the rear wheel tire without damage thereto.

The mower is provided with a reciprocating sickle 50, which is driven in a conventional manner by means of a pitman 51 connected to the sickle 50 by means of a ball and socket joint 52. The opposite end of the pitman 51 is journaled on a suitable crank carried on a flywheel 53 which is mounted on a shaft 53' journaled for rotation about a fore and aft extending axis on the supporting casting 34. The outer surface of the flywheel 53 serves as a pulley to receive the belt 55 which is trained over a driving pulley 56 on the propeller shaft 18. During operation the belt 55 is maintained tight in power transmitting relation by means of an idler pulley 57 carrier on an arm 58 which is swingably supported on the tractor frame. When the cutter bar structure swings rearwardly, the pulleys 53, 56 swing closer together and loosen the belt, thereby interrupting the drive to the sickle 50. The latch bar 40 is braced to the shoe arch 31 by means of a tie rod 61, which is swingably connected to permit the arm 27 to swing vertically in a transverse plane.

Coming now to that part of the structure with which my invention is more directly concerned, the cutter bar 26 is provided with an arcuate sheave member 65 which is formed as a sector of a circle about the axis of the pivot bolt 29 and is rigidly secured to the cutter bar 26. A lifting cable 66 and a counterbalance cable 67 are both connected at their outer ends to the arcuate member 65 and cable 66 is trained upwardly and inwardly over the circumference of the latter, from which it extends substantially parallel to the cutter bar supporting arm 27. The counterbalancing cable 67 is connected to a tension spring 68, best shown in Figures 1 and 4, the latter being anchored to a bracket 69 which is attached to the rearwardly turned portion 33 of the cutter bar supporting arm 27.

The lifting cable 66 passes around a pulley 70, which is journaled in a clevis 71 that is anchored by means of an eye bolt 72 on the forwardly extending latch arm 40. From the pulley 70 the lifting cable 66 passes upwardly over and is fixed to a sheave sector 73 which is mounted on a pair of spokes 74 fixed to a hub 75 which is journaled on a short transversely disposed shaft 76. The shaft 76 is supported in a sleeve 81, which is rigidly fixed to a vertically extending plate 77, the lower end of which is bolted by means of a bolt 78 to a rigid bracket 79 welded on the left hand frame member 12, see Figure 4.

Thus, it is evident that by rotating the sheave sector 73 in a clockwise direction, as viewed in Figure 2, a tension force is applied through the lifting cable 66 to the cutter bar 26 to raise the latter about the axis of the pivot bolts 29, 30, and will result in the cutter bar 26 being raised to a vertical transport position. The sheave 73 is rotated by means of a bifurcated arm 85 which is fixed at its lower end to the short shaft 76 and extends upwardly therefrom. The two sides of the arm 85 support therebetween a nut 86, which has a pair of laterally extending trunnions 87, which are received within vertical slots 88 in the upper ends of the arm 85. The nut 86 threadably engages a threaded shaft 89 which is disposed longitudinally of the frame 12 and is journaled at the front and rear ends thereof in depending brackets 90 on a frame member 91, the latter being supported at its rear end on the steering wheel supporting column 92 and at its forward end on a U-shaped bracket 93 which is bolted to the inner supporting plate 77 by bolts 94 and extends outwardly therefrom, see Figure 4. The outer end of the bracket 93 supports the frame member 91 on bolts 95. By rotating the threaded shaft 89 in one direction or the other selectively, the nut 86 can be shifted therealong in either direction and thus acting through the trunnions 87 to swing the arm 85 about the axis of the shaft 76.

The arm 85 engages the pulley sheave 73 by means of a lug or arm 96 which is welded to the hub 75 of the sheave and bears against the rear side of the arm 85, see Figures 2 and 4. The lug 96 thus provides a lost motion connection between the sheave and the arm 85 so that when the latter is swung rearwardly or to the right, as viewed in Figure 2, the sheave 73 is rotated in a clockwise direction to wind up the cable 66, but when the arm 85 moves forwardly or to the left, as viewed in Figure 2, it is free to move away from the lug 96, but the weight of the cutter bar acts through the cable 66 and tends to rotate the sheave 73 counterclockwise to maintain the lug 96 in contact with the arm 85. The sheave 73 and the arm 85 are connected together by means of a tension spring 97 which tends to rotate the sheave 73 clockwise with respect to the arm 85 and thus keep the cable 66 tight at all times. Hence, when the cutter bar rides over a rise in the ground, the cable 66 is slackened and this permits the spring 97 to rotate the sheave 73 to prevent the cable from kinking or tangling.

The threaded shaft 89 is rotated in either direction selectively, by means of a reversible clutch mechanism 100, which will now be described. On the forward end of the threaded shaft 89 is fixedly attached a driven clutch member 101, comprising inner and outer cylindrical members 102, 103, respectively, mounted on a radially disposed web plate 104 fixed to a hub 105, which is in turn fixed to the shaft 89. Disposed between the inner and outer cylindrical members 102, 103 is a driving wheel 106 fixedly mounted on a driving shaft 107. The forward end of the drive shaft 107 is journaled in a bracket 108 fixed to a vertical support 109 which is attached to any convenient part of the tractor frame, as by bolts 110. The rear end of the drive shaft 107 is journaled in a bracket 114 supported on the end of an arm 115 which is pivotally supported on a bolt 116 which is carried in a bracket 117 fastened by bolts 118 to an upwardly projecting lug 119 on the right hand tractor frame member 12. Thus, by swinging the arm 115 vertically up or down, the drive wheel 106 can be engaged with either the outer or inner cylindrical members 103, 102, respectively, and the diameter of the drive wheel 106 is slightly less than the distance between the two cylindrical members 102, 103, so the drive wheel 106 can be held intermediate the two cylindrical members so that it touches neither one of them. The drive shaft 107 is driven at substantially constant speed by means of a power transmitting belt 125 which is trained over a pair of pulleys 126, 127 mounted on the engine power shaft 18 and the drive shaft 107, respectively.

The drive wheel 106 is faced with a suitable friction driving material through which the driven clutch member 101 can be driven in one direction or another, depending upon which one of the cylindrical driving members 102, 103 the drive wheel 106 is held against by means of the mounting arm 115.

A brake member 121 engages the outer surface of the clutch member 103 and is mounted on a bolt 122, attached to the support 77. A spring 123 encircles the bolt 122 and exerts pressure through the member 121 against the clutch member 103 to prevent the latter from spinning when the clutch wheel 106 is disengaged therefrom.

Control of the arm 115 is secured by means of a control rod 130 which has a crank 131 at the forward end thereof engaging an eye bolt 132 which extends through an aperture in the end of the control arm 115 and has a nut 135 on the opposite end thereof. A pair of compression springs 133, 134 are coiled around the eye bolt 132 between the arm 15 and the head of the eye bolt 132 and the nut 135, respectively. The control rod 130 extends generally horizontally rearwardly to a handle portion 136 at the rear end thereof convenient to the operator of the machine. The forward end of the control rod 130 is journaled in an upwardly extending bracket member 137, which is supported on the bracket plate 93, and the rear end of the rod 130 is journaled in a bracket 138, which is clamped by clamping bolts 139 to the steering column 92. When the handle 136 of the control rod 130 is turned in one direction or the other, the crank 131 compresses one of the compression springs 133, 134, which urges the arm 115 up or down as the case may be and engages the drive wheel 106 with one of the cylindrical clutch members 102, 103. The control rod 130 is retained in either position by means of a spring 140 which tends to force the control rod 130 forwardly until the handle 136 presses against the bracket 138, and the latter is provided with suitable serrations or grooves to hold the handle 136 in any position in which it is set.

The operator can return the handle 136 to the neutral or disengaged position of the drive wheel 106 to arrest the movement of the lifting mechanism at any point within its range, but if he does not so return the handle, an automatic shut-off means is provided to return the latter to neutral position when the arm 85 has reached either end of the threaded shaft 89. As indicated in Figure 5, an arm 145 is rigidly fixed, as by welding, to the arm 85 and swings therewith about the axis of the shaft 76. Pivoted to the outer end of the arm 145, by means of a bolt 146, is a vertically extending rod 147 which extends upwardly through a suitable aperture in the bracket plate 93 and extends above the latter adjacent the control rod 130. A pair of vertically spaced ears or lugs 148 are clamped adjacent the upper end of the rod 147 and each of these lugs 148 is adapted to engage a cooperative lug 149, a pair of which are clamped to the control rod 130 in fore and aft spaced relation. When the control rod 130 is in neutral position, the lugs 149 extend upwardly and downwardly, respectively, in a vertical plane, but when the control rod 130 is rotated in one direction or another to engage the control arm 115, one or the other of the lugs 149 is rotated into the path of vertical movement of one of the lugs 148 on the vertical rod 147, and hence as the arm 85 moves toward one end of its range, carrying with it the arm 145 and rod 147, one of the lugs 148 moves into contact with one of the lugs 149 on the control rod 130 and continued movement forces the control rod 130 to return to neutral position. Thus, it is evident that after the operator has turned the control rod 130 to raise or lower the cutter bar, no further attention need be paid to the control mechanism as it will automatically shut off when the nut 86 reaches one end or the other of the threaded shaft 89.

We will now describe the mechanism for holding the cutter bar at an elevated position for purposes of mowing along curbings and the like, as mentioned hereinbefore. The cutter bar 26 is held in vertically adjusted position by means of a manually controlled lever 150 which is pivotally mounted on a transverse shaft 151, see Figure 1. The shaft 151 is journaled in suitable laterally spaced brackets 152 fixed to the transverse frame member 37, and the outer end of the shaft 151 is bent forwardly to provide a crank arm 153. A sector 154 is fixed rigidly on one of the brackets 152 and is engaged by a suitable latch actuated by a hand lever 155 mounted at the upper end of the control lever 150, to hold the lever 150 in adjusted position.

Figure 6:
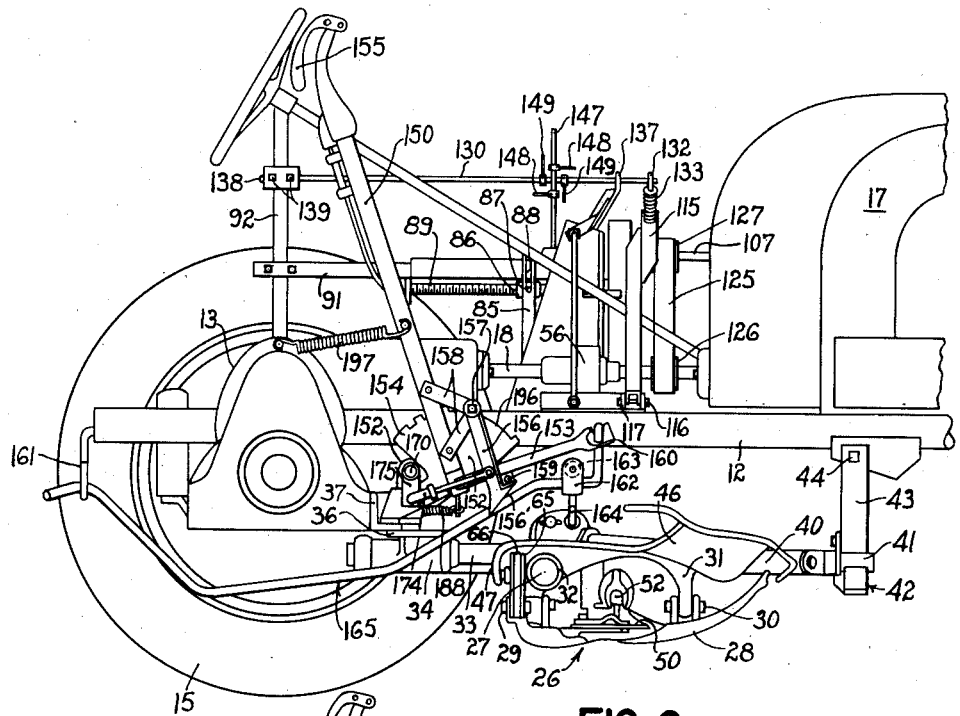
Figure 6 is a side elevation of the tractor mounted mower as viewed from the right side of the tractor, with the near tractor wheel removed.

The lever 150 is engaged with the forwardly extending lever arm 153 by means of a latch hook 156 that is pivotally connected by a bolt 157 at the apex of a pair of converging frame members 158 rigidly attached to the lower end of the lever 150. The hooked lower end of the latch hook 156 normally hooks under a projecting lug 159 fixed to the lever arm 153 and thus holds the latter in any position of adjustment, which is determined by the setting of the lever 150. The forward end of the lever arm 153 is notched at 160 to receive the forward hooked end of a longitudinally extending track member 165. The track member 165 extends downwardly from its forward support on the lever arm 153 and then extends substantially horizontally rearwardly for a short distance from which it bends downwardly and rearwardly under the rear axle housing 13 of the tractor, rising at the rear of the rear axle housing to a rear support 161 fixed to the rear end of the right hand tractor frame member 12. A track follower 162 rides on the track 165 and includes a roller 163, which is adapted to roll along the track 165, and an eye bolt 164, which is connected to an upwardly extending flange 166 on the shoe arch supporting sleeve 32. Normally the track follower 162 hangs on the horizontal forward portion 167 of the track member 165 so that the setting of the hand lever 150 determines the height of operation of the cutter bar shoe 28, as illustrated in Figure 6.

Figure 7:
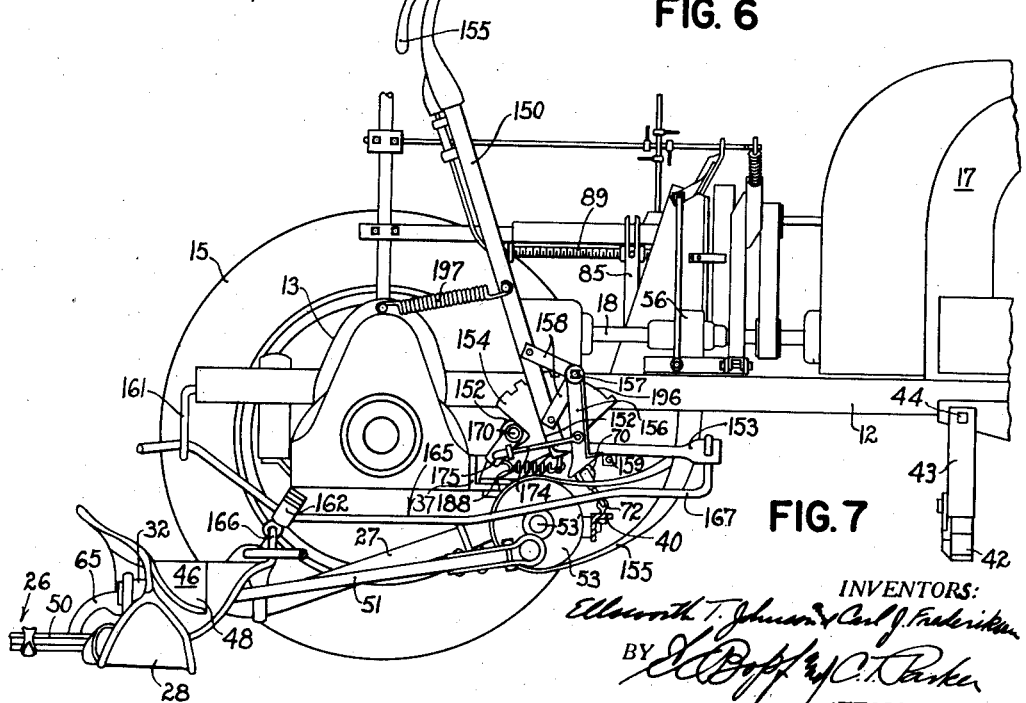
Figure 7 is a view similar to Figure 6, but with the mower shown in rearward trailing position.

When the cutter bar 26 encounters an obstruction, however, the cutter bar swings rearwardly about the pivot bolt 35 and thus disengaging the forward end 41 of the latch arm 40 from the latch mechanism 42. It is then necessary for the rear wheel 14 of the tractor to ride up over the curved rear end 47 of the ramp 46 and over the curved forward end 48, and thus placing the cutter bar in rearwardly trailing position, as illustrated in Figure 7. It is obvious, however, that it is necessary to drop the cutter bar from its raised position in order to permit the wheel 14 to ride over the ramp 46, and this is accomplished by swinging the latch hook 156 out of engagement with the projecting lug 159 to allow the arm 153 and track 165 to drop with the cutter bar.

The mechanism for disengaging the latch hook 156 includes a transversely disposed rock shaft 170, journaled at its right-hand end in the bracket 152 which supports the shaft 151 and lever 150, and at its left-hand end in a bearing support 171, see Figure 8, which is mounted on the supporting plate 36. The bearing 171 is slotted at 172 to receive the rock shaft 170, the latter being retained in the slot by a suitable cotter key 173. The latch hook 156 is connected by a link 174 to an arm 175 fixed to the rock shaft 170. Thus it is evident that by rocking the rock shaft 170 to swing the arm 175 rearwardly, the latch hook 156 is swung rearwardly about its pivot bolt 157 and disengaging its lower hooked end from the projecting lug 159 on the arm 153.

The rock shaft 170 is rocked by means of a pair of camming elements at the opposite end of the rock shaft, best illustrated in Figures 8 and 9. The opposite end of the rock shaft is provided with an arm 176, on the end of which is journaled a camming roller 177. Fixed to the mower supporting casting 34 is a camming element 180 having a rearwardly projecting nose 181, which extends over the camming roller 177 and has on its under side a downwardly and rearwardly extending camming surface 179, which bears against the roller 177 as the mower swings about the pivot bolt 35, forcing the arm 176 downwardly and rocking the rock shaft 170 and thereby swinging the opposite arm 175 rearwardly. The camming member 180 is supported on a vertically disposed longitudinally extending flange portion 182 on the mower supporting casting 34 and is adjusted in a fore and aft direction by means of a set screw 183 which engages a threaded aperture in a flange 184 on the forward end of the camming member 180, and extends therethrough and bears against the end of the casting flange 182. The set screw 183 is locked in adjusted position by means of a lock nut 185 and the camming member 180 is secured to the flange 182 in adjusted position by means of a pair of bolts 186 extending through apertures in the flange 182 and through longitudinal extending slots 187 in the camming member 180. Thus the camming member 180 can be adjusted fore and aft to adjust the relation between the rocking of the rock shaft and the swinging of the cutter bar structure in order to insure that the latch hook 156 is disengaged from the projecting lug 159 at the proper time. The latch hook 156 is biased toward engaged position by means of a spring 188 connected to the arm 175 and anchored to the bracket 152, as illustrated in Figures 6 and 7.

The rock shaft 170 is held in fixed position after it has been rocked by the camming member 180 to disengage the latch hook 156. This is accomplished by means of a detent member 190 in the form of a bell crank pivoted at 191 intermediate its ends to the mower supporting plate 36, and having a notched end 192 which engages a downwardly extending lug 193 on the rock shaft 170. The detent member 190 is urged toward holding position by means of a coil spring 195 which is anchored to the frame member 38, as best shown in Figure 8. The detent 190 is held in disabled position when the mower is in normal operating position, by the opposite end 194 of the bell crank, which is engaged by the rear edge of the camming member 180. Thus it is evident that when the cutter bar 26 encounters an obstruction and disengages the latch arm 40 from the latch 42, upon rearward swinging movement of the cutter bar structure the camming member 180 moves forwardly relative to the camming roller 177 and forces the latter downwardly to rock the rock shaft 170, and thereby swinging the arm 175 rearwardly together with the latch hook 156. At the same time the camming member 180 moves forwardly away from the detent member 190 and thereby allowing the spring 195 to swing the detent into the position shown in dotted lines in Figure 8, whereupon the notched end 192 engages the downwardly extending lug 193 and holds the rock shaft in a position in which the latch hook 156 is retracted. as best shown in Figure 7. When the mower is returned to normal operating position, the latch member 180 swings rearwardly once more into engagement with the end 194 of the bell crank detent member 190 and disengaging the latter from the rock shaft lug 193, thereby allowing the rock shaft to be returned to normal position by the spring 188. At this time, however, the mower is lying on the ground and therefore in order to raise it to elevated position once more the latch hook 156 must be reengaged with the projecting lug 159 on the arm 153, which is accomplished by swinging the hand lever 150 forwardly and thereby lowering the latch hook 156 into latching engagement with the lug 159. The hook 156 is provided with an inclined end portion 156' to provide for the latching action of the hook over the lug 159.

When it is desired to operate the mower in floating contact with the ground, the lever 150 is set in a forward position. It will be noted that the forward portion 196 of the sector 154 is not notched, as is the rear portion, and therefore when the mower is operating in contact with the ground the lever 150 is free to swing through a limited range to provide for the floating action of the cutter bar on the ground. A spring 197 is connected between the lever 150 and the axle housing 13 and exerts a light pressure upon the lever to prevent the latter from falling forwardly to its extreme forward position, and thus to maintain the lever within convenient reach of the operator.

It is believed that a sufficient explanation of the method of operating a mower of the class described, has been given in connection with the various parts of the mechanism to enable one skilled in the art to understand the method of operating the machine, and therefore a repetition of the method of operation is not considered necessary.

We do not intend our invention to be limited to the exact details shown and described herein except as limited by the claims which follow.

We claim:

1. For use in an implement of the class described, having a mobile frame and a tool shiftably mounted thereon for movement between two limits, apparatus for shifting said tool comprising a threaded shaft rotatably carried on said frame, a nut engaging said threaded shaft and connected with said tool, said nut being self locking in adjusted position against axial movement along said shaft, a constantly rotatable power shaft, and optionally reversible power transmitting means for connecting said power shaft with said threaded shaft to drive the latter in either direction of rotation to move said unit axially thereon.

2. For use in an implement of the class described, having a mobile frame and a tool shiftably mounted thereon for movement between two limits, apparatus for shifting said tool comprising a threaded shaft rotatably carried on said frame, a nut engaging said threaded shaft and self locking in adjusted position against axial movement along said shaft, a sheave journaled adjacent said nut and engaged thereby, a cable wound upon said sheave and connected with the tool, a power shaft journaled on said frame, and an optionally reversible power transmitting means for connecting said power shaft with said threaded shaft to drive the latter in either direction of rotation.

3. For use in an implement of the class described, having a mobile frame and a tool shiftably mounted thereon for movement between two limits, apparatus for shifting said tool comprising a threaded shaft rotatably carried on said frame, a nut engaging said threaded shaft and self locking in adjusted position, a sheave journaled on said frame, an arm swingably mounted on said frame and engageable with said sheave to rotate the latter in one direction, said arm being connected with said nut to be moved thereby, a cable wound upon said sheave and connected with said tool, resilient means connecting said sheave and said arm for urging the same into engagement to maintain said cable tight, a power shaft journaled on said frame, and an optionally reversible power transmitting means for connecting said power shaft with said threaded shaft to drive the latter in either direction of rotation.

4. For use in an implement of the class described, having a mobile frame and a tool shiftably mounted thereon for movement between two limits, apparatus for shifting said tool comprising a threaded shaft rotatably carried on said frame, a nut engaging said threaded shaft and connected with said tool, said nut being self locking in adjusted position, a constantly rotatable power shaft, and optionally reversible power transmitting means for connecting said power shaft with said threaded shaft to drive the latter in either direction of rotation, comprising inner and outer concentric rings fixed to said threaded shaft, a drive wheel mounted on a drive shaft and disposed between said rings, shiftable support means for said drive shaft providing for shifting said wheel into engagement with either of said rings, selectively, and means for driving said drive shaft.

5. In a mower comprising a mobile frame, and a cutter bar structure pivotally mounted thereon for vertical swinging movement relative thereto, a rearwardly extending power shaft journaled on said frame, a threaded shaft mounted for rotation on said frame parallel to said power shaft, belt means for driving said threaded shaft from said power shaft, a nut threaded on said threaded shaft and means connecting said nut with said cutter bar structure whereby travel of said nut along said shaft effects a vertical movement of said structure.

6. In a mower comprising a mobile frame, a horizontally swingable support pivoted on said frame, and a cutter bar structure pivotally mounted on said support by means providing for vertical swinging movement relative thereto, a rearwardly extending power shaft journaled on said frame, a threaded shaft mounted for rotation on said frame parallel to said power shaft, belt means for driving said threaded shaft from said power shaft, a nut threaded on said threaded shaft, a sheave journaled on said frame and having a radially extending slotted arm connected therewith engaging said nut and swingable thereby to rotate the sheaves when said nut is moved along said threaded shaft, a cable wound on said sheave, and a pulley anchored adjacent the pivot mounting of said support, said cable being trained over said pulley and connected to said cutter bar structure.

7. In a mower comprising a mobile frame, and a cutter bar structure mounted thereon by means providing vertical and rearward swinging movement from normal operating position, a lever pivoted on said frame, a latch hook swingably supported on said lever, means engageable with said latch hook and connected with said cutter bar structure for raising the latter by said lever, and mechanism responsive to rearward swinging movement of said cutter bar structure to swing said latch hook out of engagement with said connected means.

8. In a mower comprising a mobile frame, and a cutter bar structure mounted thereon by means providing rearward swinging movement from normal operating position, a track member, a track follower engaging the latter and connected with said structure, means supporting said track member on said frame, a latch hook swingably connected thereto and adapted to normally engage said track member, and mechanism responsive to rearward swinging movement of said cutter bar structure to swing said latch hook out of engagement with said connected means.

9. In a mower comprising a mobile frame, and a cutter bar structure mounted thereon by means providing vertical and rearward swinging movement from normal operating position, a lever pivoted on said frame, a latch hook swingably supported on said lever, means engageable with said latch hook and connected with said cutter bar structure for raising the latter by said lever, and mechanism responsive to rearward swinging movement of said cutter bar structure to swing said latch hook out of engagement with said connected means, comprising a pair of camming elements connected to said cutter bar structure and to said latch hook, respectively.

10. In a mower comprising a mobile frame, and a cutter bar structure mounted thereon by means providing rearward swinging movement from normal operating position, a track member, a track follower engaging the latter and connected with said structure, means supporting said track member on said frame, a latch hook swingably connected thereto and adapted to normally engage said track member, and mechanism responsive to rearward swinging movement of said cutter bar structure to swing said latch hook out of engagement with said connected means, comprising a pair of camming elements connected to said track member and to said latch hook, respectively.

11. In a mower comprising a mobile frame, and a cutter bar structure mounted thereon by means providing vertical and rearward swinging movement from normal operating position, a lever pivoted on said frame, a latch hook swingably supported on said lever, means engageable with said latch hook and connected with said cutter bar structure for raising the latter by said lever, mechanism responsive to rearward swinging movement of said cutter bar structure to swing said latch hook out of engagement with said connected means, and detent means for retaining said latch hook in disengaged position, said detent being disabled by said cutter bar structure swinging into said normal operating position.

12. In a mower comprising a mobile frame, and a cutter bar structure mounted thereon including a supporting arm pivotally mounted at one side of the tractor for vertical and horizontal swinging movement and a cutter bar extending laterally from the opposite side of the frame and pivoted on the supporting arm, a lifting lever pivoted on said frame at said opposite side, a latching element pivoted on said lever and engaging a cooperative latching element connected with said cutter bar structure, a rock shaft mounted on said frame and connected with said pivoted latching element by means providing for swinging the latter out of latching engagement by rocking said rock shaft, and a pair of camming elements attached to said rock shaft and to said cutter bar structure adjacent the pivotal mounting of said supporting arm, so constructed and arranged that rearward swinging movement of said supporting arm causes said rock shaft to rock and hence to swing said latching element out of engagement.

13. In a mower comprising a mobile frame and a cutter bar structure mounted thereon including a supporting arm pivotally mounted at one side of the tractor for vertical and horizontal swinging movement and a cutter bar extending laterally from the opposite side of the frame and pivoted on the supporting arm, a track member extending longitudinally of said frame adjacent said opposite side, a track follower on said track and connected to said supporting arm, means for supporting said track member including a lever pivoted on said frame, a latching element pivoted on said lever and adapted to engage said track member, a transverse rock shaft mounted on said frame and connected with said latching element by means providing for swinging the latter out of latching engagement by rocking said rock shaft, and a pair of camming elements attached to said rock shaft and to said cutter bar structure adjacent the pivotal mounting of said supporting arm, so constructed and arranged that rearward swinging movement of said supporting arm causes said rock shaft to rock and hence to swing said latching element out of engagement.

14. In a mower comprising a mobile frame and a cutter bar structure mounted thereon including a supporting arm pivotally mounted at one side of the tractor for vertical and horizontal swinging movement and a cutter bar extending laterally from the opposite side of the frame and pivoted on the supporting arm, a track member extending longitudinally of said frame adjacent said opposite side, a track follower on said track and connected to said supporting arm, means for supporting said track member including a lever pivoted on said frame, a latching element pivoted on said lever and adapted to engage said track member, a transverse rock shaft mounted on said frame and connected with said latching element by means providing for swinging the latter out of latching engagement by rocking said rock shaft, a pair of camming elements attached to said rock shaft and to said cutter bar structure adjacent the pivotal mounting of said supporting arm, so constructed and arranged that rearward swinging movement of said supporting arm causes said rock shaft to rock and hence to swing said latching element out of engagement, and a detent member pivotally mounted on said frame and having means biasing the same to retain said latching element in disengaged position, said detent member being normally disposed in engagement with said cutter bar structure to hold said detent member in disabled position.

15. In a mower comprising a wheel supported engine driven frame having a longitudinally arranged power shaft, a cutter bar structure mounted on said frame by means providing for vertical swinging movement relative thereto, a threaded shaft journaled on said frame, a nut threaded on the latter, a sheave connected with said nut to be rotated thereby, a cable wound on said sheave and attached to said cutter bar structure, a counter shaft journaled on said frame generally parallel to said power shaft, a power belt trained over said power and counter shafts, reversible control means for optionally connecting said counter shaft to said threaded shaft to drive the latter selectively in opposite directions to move said nut axially thereof, a pulley on said cutter bar structure, a sickle mounted on said structure and connected to said pulley to receive power therefrom, and a second power belt trained over said power shaft and said sickle driving pulley.

16. For use in an implement of the class described, having a mobile frame and a tool shiftably mounted thereon for movement between two limits, apparatus for shifting said tool comprising a threaded shaft rotatably carried on said frame, a nut engaging said threaded shaft and self locking in adjusted position against axial movement along said shaft, a sheave journaled adjacent said nut and having a radially extending slotted arm connected therewith engaging said nut and swingable thereby to rotate the sheave when said nut is moved along said threaded shaft, a cable wound upon said sheave and connected with the tool, a power shaft journaled on said frame, and an optionally reversible power transmitting means for connecting said power shaft with said threaded shaft to drive the latter in either direction of rotation.

17. In a mower comprising a mobile frame, and a cutter bar structure mounted thereon by means providing vertical and rearward swinging movement from normal operating position, a latch hook swingably supported on said frame, means engageable with said latch hook and connected with said cutter bar structure for holding the latter in elevated position, and mechanism responsive to rearward swinging movement of said cutter bar structure to swing said latch hook out of engagement with said connected means.

ELLSWORTH T. JOHNSON.
CARL J. FREDERIKSEN.